United States Patent
Mili et al.

(10) Patent No.: US 8,823,228 B2
(45) Date of Patent: Sep. 2, 2014

(54) TRANSMISSION DRIVE UNIT HAVING A SELF-LOCKING DEVICE

(75) Inventors: Tarek Mili, Karlsruhe (DE); Detlef Lauk, Renchen (DE); Uwe Merkelbach, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 723 days.

(21) Appl. No.: 13/002,534

(22) PCT Filed: Jun. 23, 2009

(86) PCT No.: PCT/EP2009/057845
§ 371 (c)(1),
(2), (4) Date: May 26, 2011

(87) PCT Pub. No.: WO2010/000650
PCT Pub. Date: Jan. 7, 2010

(65) Prior Publication Data
US 2011/0221291 A1    Sep. 15, 2011

(30) Foreign Application Priority Data

Jul. 4, 2008  (DE) .......................... 10 2008 040 189
Oct. 24, 2008  (DE) .......................... 10 2008 043 173

(51) Int. Cl.
| | |
|---|---|
| *H02K 7/102* | (2006.01) |
| *H02K 7/116* | (2006.01) |
| *F16H 1/16* | (2006.01) |
| *H02K 1/17* | (2006.01) |
| *E05F 11/50* | (2006.01) |

(52) U.S. Cl.
CPC .............. *H02K 7/1166* (2013.01); *H02K 7/102* (2013.01); *E05Y 2900/55* (2013.01); *F16H 1/16* (2013.01); *H02K 1/17* (2013.01); *E05F 11/505* (2013.01); *E05Y 2201/49* (2013.01)
USPC ............................................... 310/83; 310/77

(58) Field of Classification Search
USPC ................................................ 310/77, 83, 89
See application file for complete search history.

(56) References Cited

U.S. PATENT DOCUMENTS 3,789,248 A * 1/1974 Jaecklin et al. ............... 310/355
3,930,566 A   1/1976 Matsushima
(Continued)

FOREIGN PATENT DOCUMENTS

DE    19753106 A1    2/1999
EP    1717930 A2 * 11/2006
(Continued)

OTHER PUBLICATIONS

PCT/EP2009/057845 International Search Report.

*Primary Examiner* — Quyen Leung
*Assistant Examiner* — Naishadh Desai
(74) *Attorney, Agent, or Firm* — Michael Best & Friedrich LLP

(57) ABSTRACT

Transmission drive unit (10), in particular for adjusting movable parts in the motor vehicle, having a drive motor (12) and a transmission (14) which is driven thereby, wherein the transmission (14) has an output element (70) and a self-locking device (60) with a locking element (63, 55), and the locking element locks the transmission (12) with respect to torques which are applied to the transmission (12) by the output element (70), wherein the transmission (12) with its transmission toothing (47) and a motor shaft bearing (32, 28) is designed to have optimized efficiency and minimal friction, and the drive motor (12) has, as an exciter magnet, a sleeve-shaped annular magnet (18) which is arranged in a pole pot (16) which forms a magnetic return.

19 Claims, 2 Drawing Sheets

(56) References Cited

U.S. PATENT DOCUMENTS

| | | | |
|---|---|---|---|
| 4,593,218 A * | 6/1986 | Streeter | 310/103 |
| 4,652,781 A | 3/1987 | Andrei-Alexandru et al. | |
| 5,015,898 A * | 5/1991 | Frey | 310/83 |
| 5,404,060 A * | 4/1995 | Nakahashi et al. | 310/83 |
| 6,509,662 B2 * | 1/2003 | Suzuki et al. | 310/154.22 |
| 6,798,102 B2 * | 9/2004 | Adachi | 310/78 |
| 2003/0052564 A1 * | 3/2003 | Wilsdorf | 310/179 |
| 2003/0111921 A1 * | 6/2003 | Honkura et al. | 310/154.12 |
| 2004/0187294 A1 | 9/2004 | Inaishi et al. | |
| 2005/0040728 A1 * | 2/2005 | Hirzel | 310/268 |
| 2005/0069435 A1 | 3/2005 | Ikeya et al. | |
| 2005/0179330 A1 * | 8/2005 | Habele | 310/77 |
| 2007/0216255 A1 * | 9/2007 | Weigold et al. | 310/234 |
| 2008/0124235 A1 * | 5/2008 | Honkura et al. | 417/423.14 |
| 2008/0223164 A1 | 9/2008 | Greulich et al. | |
| 2009/0072656 A1 * | 3/2009 | Eisert et al. | 310/244 |
| 2010/0139434 A1 * | 6/2010 | Huesges et al. | 74/425 |

FOREIGN PATENT DOCUMENTS

| | | |
|---|---|---|
| JP | 11507497 | 6/1999 |
| JP | 2003333817 | 11/2003 |
| JP | 2004511194 | 4/2004 |
| JP | 2006307899 | 11/2006 |
| JP | 2007143278 | 6/2007 |

* cited by examiner

TRANSMISSION DRIVE UNIT HAVING A SELF-LOCKING DEVICE

BACKGROUND OF THE INVENTION

The invention relates to a transmission drive unit having a self-locking device, in particular for adjusting movable parts in the motor vehicle.

DE 197 53 106 C2 has disclosed a load torque lock which is installed in a drive train and, when the drive is at a standstill, automatically locks the torques which are introduced by the output means. In contrast, the torques which are introduced from the drive side are transmitted in both rotational directions. To this end, a drive shaft is penetrated by the attachment components of an output shaft. Between these two shafts which can be rotated counter to one another, radial webs and clamping and locking elements are arranged which permit or lock a rotation with respect to a clamping ring unit as a function of the drive-side or output-side introduction of the torques. A load torque lock of this type comprises a multiplicity of individual parts which are complicated to assemble and require a large amount of installation space. As a result, the transmission drive unit is relatively large and has a heavy configuration, as a result of which a correspondingly powerful electric motor is required for driving.

SUMMARY OF THE INVENTION

Advantage of the Invention

The transmission drive unit according to the invention having a self-locking device having the characterizing features of independent claim 1 has the advantage that, as a result of the inexpensive configuration of a transmission with reduced friction in the case of identical applications, at the same time a drive motor with a relatively low weight can be used. To this end, the exciter magnet of the electric motor is configured as a toric magnet of relatively small and lightweight construction which encloses the armature assembly with the winding coils. As a result of the fact that the load torque lock is formed by a separate self-locking device, a transmission which is optimized with respect to the degree of efficiency can also be used for actuating drives, in which the transmission is to be locked in the case of an output-side action of load, as is required, for example, in window lifter drives, sunroof drives, wiper drives or seat drives.

Advantageous developments and improvements of the device specified in the dependent claim are possible as a result of the measures which are described in the dependent claims. For instance, the power density of the drive motor can be increased such that the permanently excited magnet of the electric motor can also have more than two magnetic poles. An even number of magnetic poles is preferably used, for example 2, 4, 6 or 8 magnetic poles, an optimum compromise between the increase in the power density and the magnetizability of the toric magnet being achieved for these motor sizes in the case of the configuration of exactly 4 magnetic poles.

It is particularly favorable to configure the wall thickness of the toric magnet to be between 0.5 mm and 3 mm, it being possible for a particularly favorable power density of the electric motor to be achieved in the case of a comparatively small wall thickness of from 0.5 mm to 1.5 mm, for example approximately of 1.0 mm. It is particularly advantageous here for the weight reduction of the overall drive if the relation between the external diameter of the toric magnet and its wall thickness lies approximately between 15:1 and 40:1.

A highly energetic material, preferably rare earth elements, is expediently used for the production of an annular magnet of this type. Here, this material can be formed particularly inexpensively into an annular magnet by sintering or being bonded in a plastic. Here, NdFeB is one particularly preferred high energy magnetic material.

It is advantageous to arrange the toric magnet in a circular pole pot which is preferably produced by means of deep drawing. Here, the external diameter of the pole pot is, for example, between 25 mm and 33 mm, and the wall thickness is approximately between 1 mm and 2 mm, which is sufficient for the magnetic yoke. The wall thickness of the pole pot in the cylindrical region is preferably approximately 1.5 mm.

In order to increase the power density of the electric motor, the laminations of the armature assembly are produced from a high quality iron material and, in particular, from a thinner lamination sheet (in comparison with customary standard laminations on the market), with the result that the degree of efficiency of the electric motor is increased considerably in conjunction with the thin walled toric magnet.

If the transmission of the transmission drive unit is configured as a worm transmission, the toothing between the worm which is arranged on the drive shaft and the corresponding worm gear can be of particularly low friction configuration. To this end, the worm toothing has a reduced engagement angle of, for example, from 4° to 8°, and the surfaces of the toothing can be configured in a manner which is particularly optimized with respect to the degree of efficiency, with a low coefficient of friction (friction=approximately 0.025). To this end, a lubricant which is optimized with respect to the degree of efficiency can be used, for example Topas L32.

In order to minimize the friction of the transmission drive unit, the drive shaft is mounted firstly by way of a ball bearing which is arranged directly in the transmission housing, preferably in an axial cylindrical projection of the latter. In the pole pot, preferably on its bottom face, the drive shaft is mounted, in contrast, by means of a sliding bearing which is preferably formed from sintered bronze.

Here, the ball bearing can absorb all the acting axial forces of the drive shaft, with the result that the sliding bearing in the pole housing is configured as a floating bearing, as a result of which the friction of the transmission drive unit is additionally reduced.

In terms of manufacturing technology, the worm is formed directly onto the drive shaft, particularly favorably by means of a rolling or roll forming process, by means of plastic material forming. The external diameter of the worm is considerably greater than the diameter of the drive shaft in the adjacent regions to the worm. A diameter of the drive shaft of approximately from 5 to 8 mm is particularly suitable for this method, a 6 mm shaft being used particularly preferably. The drive shaft in the region of the worm can preferably be configured in one piece with the armature shaft in the region of the stack of laminations; in an alternative embodiment, however, they can also be configured as separate components which are then connected, for example, by means of a coupling.

In order to mount the worm gear, a bearing dome which engages into the hub of the worm gear is formed in the bottom face of the transmission housing. Here, the bearing dome is manufactured from plastic in one piece, for example, with the transmission housing bottom. As an alternative, a bearing pin made from another material (for example, metal) can also be arranged in the transmission housing for receiving the worm gear.

In order to supply the electric motor, the carbon brushes are advantageously configured as hammer brushes, the spring tabs of which extend in the axial direction along the drive shaft. Here, an arrangement of two carbon brushes which are arranged offset in the circumferential direction by 90° is particularly favorable. Here, the brush carrier is of annular configuration and is inserted within an annular projection of the transmission housing.

Since all the axial forces which act on the drive shaft are received by the ball bearing which is arranged in the transmission housing, no great tensile forces act at the interface between the pole pot and the transmission housing. The pole pot can therefore be joined reliably together, advantageously by means of a positively locking connection, for example by calking or another material forming operation. To this end, the pole pot is advantageously arranged on the cylindrical outer wall of the transmission housing projection. An O-ring which is likewise pushed onto the cylindrical projection of the transmission housing is arranged, for example, as a seal between the pole pot and the transmission housing.

In one preferred embodiment, as the locking element, the self-locking device has a wrap spring which is inserted between the worm gear and the driver. Here, a brake drum of the spring is received in the transmission housing or in its lid or in a separate component.

In a particularly space saving manner, the wrap spring bears here radially against the transmission housing and, without the use of additional separate components, engages firstly into the worm gear and secondly into the driver or the output element.

The self-locking device having the locking element can also be integrated into the adjusting system of the movable part, for example as a constituent part of seat elements or a window lifter mechanism. Here, the transmission can be arranged directly on the drive motor and/or in the adjusting system. Here, the drive motor and/or at least one part of the transmission are/is always configured to be optimized with respect to the degree of efficiency. Together with at least one part of the transmission, the drive motor is preferably configured as an integrated, compact structural unit which forms a defined interface with the part to be adjusted or its adjusting system. The self-locking device is advantageously arranged in the drive motor/transmission unit which can be separated (delivered), but can also be arranged in the part to be adjusted or in its adjusting system. In any case, the load torque which acts on the transmission drive unit from the movable part is advantageously locked effectively.

BRIEF DESCRIPTION OF THE DRAWINGS

Exemplary embodiments of the invention are shown in the drawings and explained in greater detail in the following description.

In the drawings.

DETAILED DESCRIPTION

Figure 1:
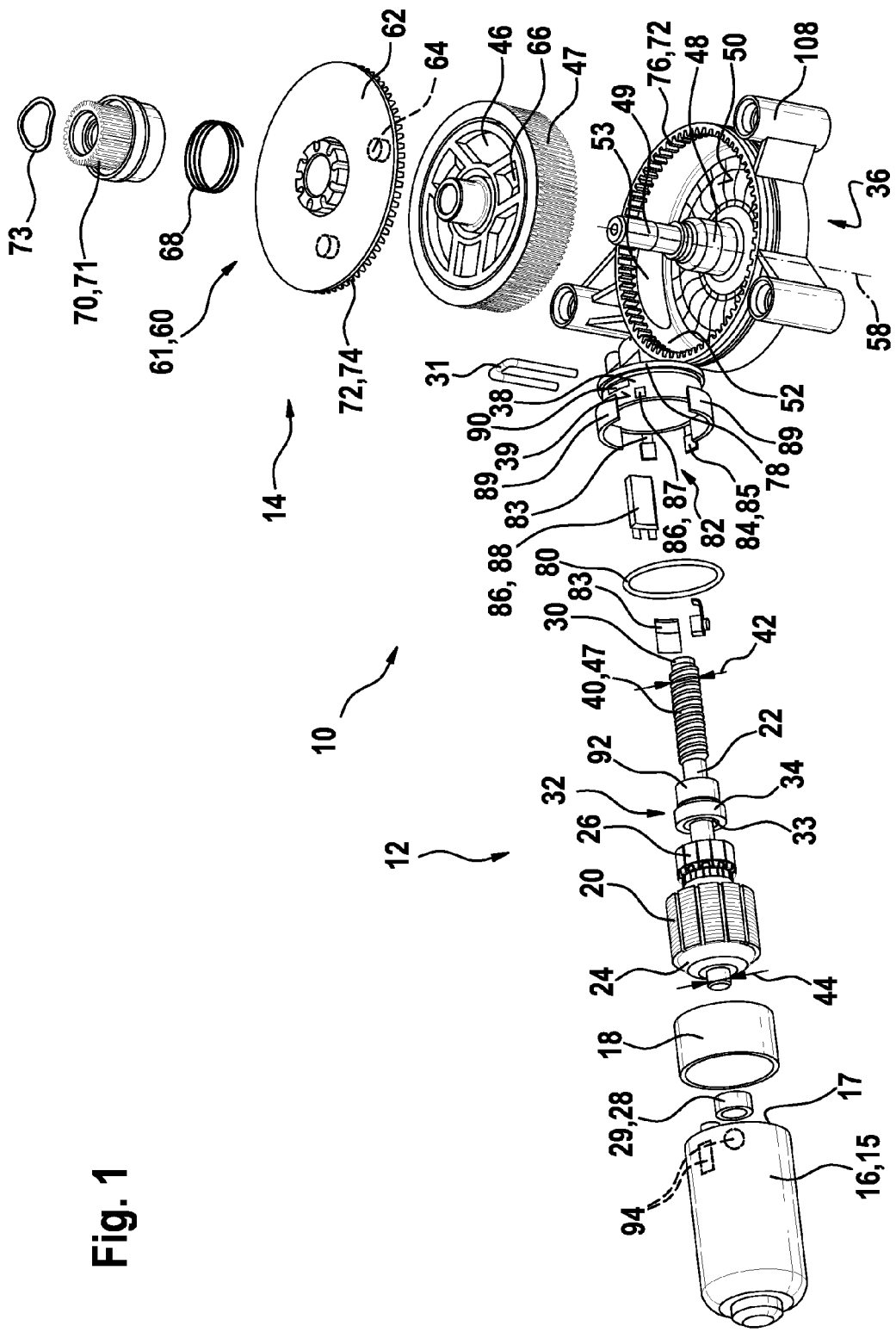
FIG. 1 shows an exploded illustration of a transmission drive unit according to the invention.

FIG. 1 shows a transmission drive unit 10 which has a drive motor 12 and a transmission 14. The drive motor 12 has a pole pot 16 as motor housing 15, in which a toric magnet 18 is arranged as exciter magnet. In the exemplary embodiment, the toric magnet 18 is configured as a high energy permanent magnet which contains NdFnB as rare earth material. A laminate core 20 having a plurality of laminations 21 is arranged within the toric magnet 18, which laminate core 20 is fastened on a drive shaft 22. The stack of laminations 20 has an electric winding 24 which is connected to a commutator 26. The drive shaft 22 is mounted in the pole pot 16 by means of a sliding bearing 28 which is configured here as a sintered bronze bush 29. Here, the sliding bearing 28 is configured as a floating bearing, as a result of which the drive shaft 22 can be displaced in the sliding bearing 28 in the axial direction 23. A ball bearing 32 which, after final assembly, is fixed firmly in the transmission housing 36 is arranged approximately in a central region of the drive shaft 22. The ball bearing 32 is fastened by way of an inner ring 33 on the drive shaft 22, and by way of an outer ring 34 in the transmission housing 36. As a result, the ball bearing 32 is configured as a locating bearing which absorbs all the forces which act axially on the drive shaft 22. The free end 30 of the drive shaft 22 protrudes through a cylindrical projection 38 of the transmission housing 36 and into the transmission housing 36. It does not form a stop on it. A worm 40 is arranged on the drive shaft 22 in the region of the transmission housing 36. The worm 40 is formed directly from the drive shaft 22, for example by means of plastic material forming, preferably by means of roll forming. The external diameter 42 of the worm 40 is greater than the external diameter 44 of the drive shaft 22 in the remaining region of the drive shaft 22. The worm 40 meshes with a worm gear 46 which is mounted by way of its hub 45 on a bearing dome 48 or a bearing pin 49. The bearing dome 48 is configured, for example, in one piece with the bottom face 50 of the transmission housing 36. The transmission housing 36 has a circular, radial wall 52 which has an aperture 53 toward the worm 40. Together with the worm gear 46, the worm 40 forms a worm toothing system 47 which is configured in a manner which is particularly optimized with respect to the degree of efficiency. For instance, the worm toothing system 47 has a reduced engagement angle (from 4° to 8°) and a reduced coefficient of friction of approximately 0.025.

Furthermore, a special lubricant which considerably reduces the friction of the worm toothing system 47 is arranged in the transmission toothing system 47. The worm gear 46 is likewise mounted on the bearing dome 48 by means of a special lubricant.

In the exemplary embodiment according to FIG. 1, the transmission drive unit 10 has a self-locking device 60 which is configured as a disengagement lock 61 such that it can be moved along the bearing pin 49 of the worm gear 47. To this end, a coupling element 62 has along the worm gear axis 58, which rest on a corresponding surface profile 68 of the worm gear 46. On account of a relative rotational movement of the coupling element 62 with respect to the worm gear 46, the coupling element 62 executes a movement along the worm gear axis 58, a resilient restoring element 68 applying a corresponding counterforce counter to the disengagement of the coupling element 62. The coupling element 62 is connected fixedly to an output element 70 so as to rotate with it, which output element 70 transits the torque, for example, to a part to be adjusted on the motor vehicle. In the exemplary embodiment, the output element 70 is fixed axially on the bearing pin 49 by means of a clamping ring 73. In the disengaged state, the coupling element 62 is freely rotatable with the worm gear 46 by the drive motor 12. If, however, a load moment from the drive element 70 acts on the transmission drive unit 10, the coupling element 62 is engaged on account of the relative movement with respect to the worm gear 46 and its surface profile 66 along the worm gear axis 58 with respect to the transmission housing 36. As a result, a positively locking connection 72 is formed between the coupling element 62 and the transmission housing 36, which positively locking connection 72 locks under the action of a load moment. In the exemplary embodiment, the positively locking connection 72 is configured, for example, as a circumferential toothing system 74 of the coupling element 62, which toothing system 74 engages into a corresponding mating shaped-out molding 76 of the transmission housing 36, for example in the circular transmission wall 52. The output element 70 is configured as an output pinion 71 with an external toothing system which is operatively connected, for example, to a lifting mechanism of a window lifter.

The pole pot 16 is connected to the transmission housing 36 via its radial cylindrical projection 38. Here, the inner face 17 of the pole pot 16 is supported radially on the outer surface 39 of the cylindrical projection 38. The cylindrical projection 38 has, for example, a collar 78, on which an annular seal 80, for example an O-ring, bears which is pressed by the pole pot 16 against the collar 78. Here, the pole pot 16 is connected positively to the cylindrical projection 38 by means of plastic material forming 94. Here, for example, the pole pot 16 is calked with respect to the outer surface 39 of the cylindrical projection 38 by means of ram tools. A brush holder 82 which encloses the drive shaft 22 annularly is arranged in the interior of the cylindrical projection 38. Carbon brushes 84 which are configured as hammer brushes 85 in the exemplary embodiment are arranged on the brush holder 82. The hammer brushes 85 have spring levers 83, which extend along the drive shaft 22, and bear against the commutator 26. Further electronic components 86 are arranged on the brush holder 82, for example suppression elements 87 (choking coils, capacitors, diodes) and a thermal circuit breaker 88. In addition, metallic protective plates 89 can be arranged on the brush holder 82 for shielding the electromagnetic radiation (Faraday cage). Magnetic sensors 90 are likewise arranged which, in order to detect the rotational position of the drive shaft 22, detect the magnetic transmitter signal of a sensor magnet 92 which is arranged, for example, annularly on the drive shaft 22. The ball bearing 32 is fastened on the drive shaft 22 relatively closely to the worm 40 and, during mounting after the insertion into the cylindrical projection 38, is clamped by means of a fixing element 31 within the cylindrical projection 38.

Plug pins 96 which are, for example, injection molded into the transmission housing 36 lead from the brush holder 82 out of the transmission housing 36. The electric current and/or sensor signal transmission is ensured via said plug pins 96. Fastening domes 108, by way of which the transmission drive unit 10 is screwed, for example, to the vehicle body, in particular to the vehicle door, are formed integrally on the outer circumference of the transmission housing 36.

Figure 2:
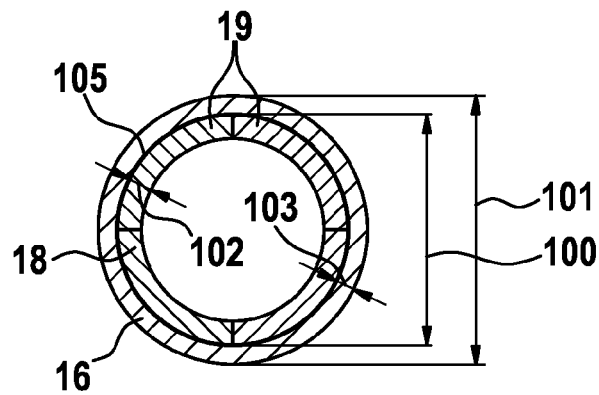
FIG. 2 shows a cross section through the pole housing.

FIG. 2 shows a cross section through the pole pot 16 with the toric magnet 18, in order to define the size ratios of the external diameters 100, 101 and the wall thicknesses 102, 103 of the pole housing 16 and the toric magnet 18. For example, an adhesive 105 is arranged as fastening means between the toric magnet 18 and the pole pot.

Figure 3:
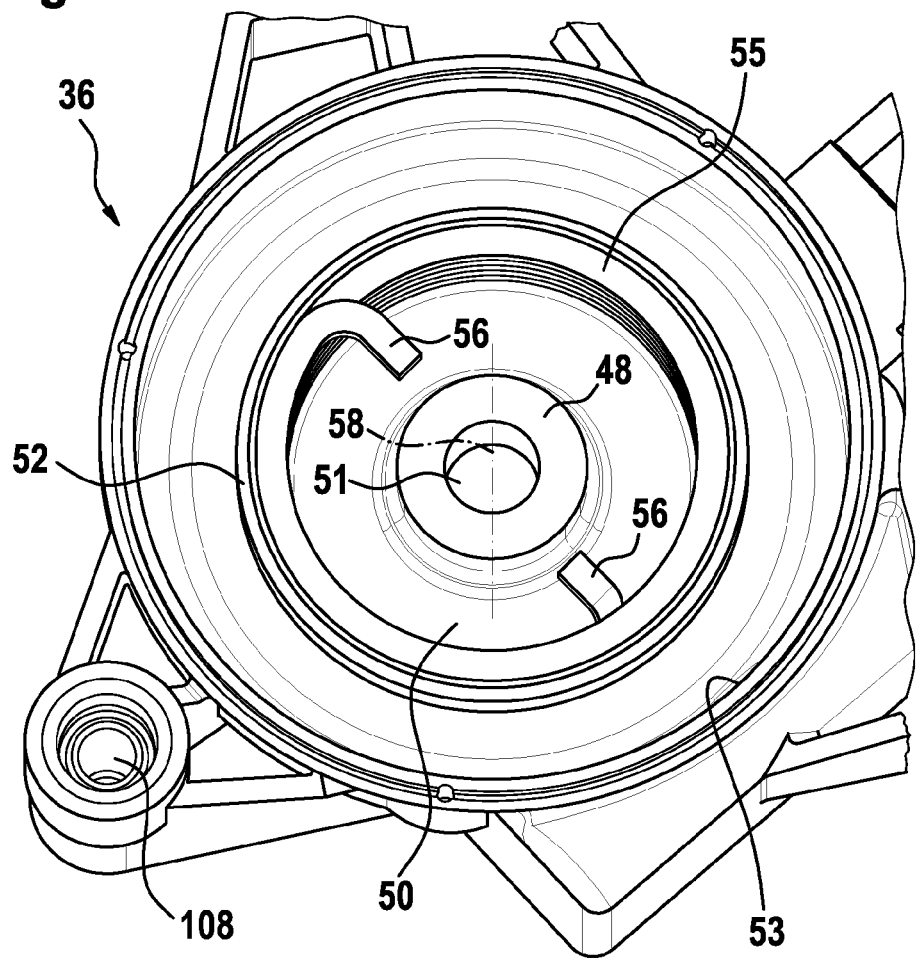
FIG. 3 shows a further exemplary embodiment with a wrap spring as self-locking device.

FIG. 3 shows an alternative exemplary embodiment, in which the self-locking device 60 has a wrap spring 55 as locking element. Here, the wrap spring 55 is arranged between the worm gear 46 and the transmission housing 36. The wrap spring 55 is of circular configuration, coaxially with respect to the worm gear 46, and is pressed against the inner side of the circular transmission wall 52 in the locked state of the transmission 14. Here, spring ends 56 of the wrap spring can be angled away radially to the inside, in order to form a positively locking connection with the worm gear 46 or the driver 70. In this exemplary embodiment, no bearing pin 49 is arranged in the transmission housing 36, but rather a through opening 51 in the bottom face 50, the worm gear 46 being mounted directly on the integrally formed bearing dome 48.

It is to be noted that, with regard to the exemplary embodiments shown in the figures and in the description, a wide variety of possible combinations of the individual features among one another is possible. Thus, for example, the wrap spring 55 can be varied as desired with regard to its geometrical forming and its material properties, and can have, for example, an encapsulation which influences the friction with respect to the surface of the transmission housings 36. The number of windings and the arrangement and forming of the spring ends 56 can likewise be adapted accordingly. The arrangement of the load torque lock 60 according to the invention within the transmission 14 can likewise be varied, an arrangement between the last output element 70 and the worm gear 46 being particularly favorable, in order to protect the transmission toothing system 47 against excessive loading. The coupling element 62 can be configured directly as an output element 70 or as a driver element which is operatively connected to the latter. The concrete forming of the bearing face of the wrap spring can likewise be varied in a wide variety of ways as a function of the forming of the wrap spring 54, the worm gear 46 and the coupling element 62. The transmission drive unit 10 is preferably used for adjusting movable parts, such as a pane, a sliding roof, a wiper, a seat part or a drive component in the motor vehicle.

Here, at least one part of the transmission 14, and therefore also the self-locking device 60, can be configured as a constituent part of the part to be adjusted or of its adjusting system. The customer connection interface between the drive motor 12 and the adjusting system can be selected here in such a way that the self-locking device 60 is integrated in the adjusting system of the part to be adjusted, or is arranged in the transmission housing 36 which is connected directly to the pole pot 16.

The invention claimed is:

1. A transmission drive unit (10), comprising:
a drive motor (12); and
a transmission (14) which is driven by the drive motor, the transmission (14) having an output element (70) and a self-locking device (60) with a locking element (62, 55), and the locking element (62, 55) locking the transmission (12) for torques which are introduced into the transmission (12) by the output element (70),
characterized in that the transmission (12) is configured with transmission toothing (47) and a motor shaft bearing (32, 28) in a manner which is optimized with respect to the degree of efficiency with minimum friction, and the drive motor (12) has, as an exciter magnet, a sleeve-shaped toric magnet (18) which is arranged in a pole pot (16) which forms a magnetic yoke,
characterized in that a drive shaft (22) is mounted in the pole pot (16) by means of a sliding bearing (28), which is mounted in the transmission housing (36) by means of a ball bearing (32), and
characterized in that the ball bearing (32) is positioned approximately in a central region of the drive shaft (22), and the drive shaft (22) is supported in the transmission housing (36) and in the pole pot (16) only in an axial direction (23) as a fixed bearing formed by the ball bearing (32).

2. The transmission drive unit (10) as claimed in claim 1, characterized in that the toric magnet (18) has two or more magnetic poles (19) in a circumferential direction.

3. The transmission drive unit (10) as claimed in claim 1, characterized in that the toric magnet (18) has a radial wall thickness (102) of between 0.5 and 3 mm and/or a ratio of the external diameter (100) to the wall thickness (102) of between 15:1 and 40:1.

4. The transmission drive unit (10) as claimed in claim 1, characterized in that the toric magnet (18) is configured as a high-energy magnet and contains rare earth elements.

5. The transmission drive unit (10) as claimed in claim 1, characterized in that the pole pot (16) is configured as a deep drawn part with a circular external diameter (101) of approximately from 25 to 33 mm and has a radial wall thickness (103) of from 1 to 2 mm.

6. The transmission drive unit (10) as claimed in claim 1, characterized in that the drive motor (12) has a rotor with a stack of laminations (20) for the electric wire winding (24), the laminations (21) having a material thickness in the axial direction (23) of less than 1.0 mm.

7. The transmission drive unit (10) as claimed in claim 1, characterized in that the transmission (14) is configured as a worm gear (14) worm toothing (47) having a reduced engagement angle of, in particular, from 4° to 8° and a coefficient of friction of approximately 0.025.

8. The transmission drive unit (10) as claimed in claim 1, characterized in that the drive shaft (22) is mounted in the transmission housing (36) and the pole housing (16) in the axial direction (23) exclusively by the ball bearing (32) which is configured as a locating bearing.

9. The transmission drive unit (10) as claimed in claim 1, characterized in that the diameter (44) of the drive shaft (22) is between 5 and 7 mm and the worm (40) is roll formed onto the drive shaft (22) and has a greater external diameter (42) than the diameter (44) of the drive shaft (22).

10. The transmission drive unit (10) as claimed in claim 1, characterized in that the transmission (14) has a worm gear (46) which is mounted on a bearing pin (49) or bearing dome (48) made from plastic.

11. The transmission drive unit (10) as claimed in claim 1, characterized in that hammer brushes (85) extend in the axial direction (23) on a brush carrier (82) which is arranged in a circularly annular manner around the drive shaft (22), the hammer brushes (85) being arranged offset by approximately 90° with regard to the circumferential direction.

12. A transmission drive unit (10), comprising:
a drive motor (12); and
a transmission (14) which is driven by the drive motor, the transmission (14) having an output element (70) and a self-locking device (60) with a locking element (62, 55), and the locking element (62, 55) locking the transmission (12) for torques which are introduced into the transmission (12) by the output element (70),
characterized in that the transmission (12) is configured with transmission toothing (47) and a motor shaft bearing (32, 28) in a manner which is optimized with respect to the degree of efficiency with minimum friction, and the drive motor (12) has, as an exciter magnet, a sleeve-shaped toric magnet (18) which is arranged in a pole pot (16) which forms a magnetic yoke,
characterized in that the pole pot (16) is connected to the transmission housing (36) by means of plastic material forming (94), and is pushed onto a sleeve-shaped axial projection (38) of the transmission housing (36).

13. The transmission drive unit (10) as claimed in claim 1, characterized in that the locking element (62, 55) is configured as a wrap spring (55) which is arranged, radially, between the worm gear (46) and the transmission housing (36).

14. A transmission drive unit (10), comprising:
a drive motor (12); and
a transmission (14) which is driven by the drive motor, the transmission (14) having an output element (70) and a self-locking device (60) with a locking element (62, 55), and the locking element (62, 55) locking the transmission (12) for torques which are introduced into the transmission (12) by the output element (70),
characterized in that the transmission (12) is configured with transmission toothing (47) and a motor shaft bearing (32, 28) in a manner which is optimized with respect to the degree of efficiency with minimum friction, and the drive motor (12) has, as an exciter magnet, a sleeve-shaped toric magnet (18) which is arranged in a pole pot (16) which forms a magnetic yoke,
characterized in that a wrap spring (55) of the self-locking device (60) comes to bear with its external diameter (42) against the inner wall (52) of the transmission housing (36) and is connected, directly, by way of its ends (56) to the worm gear (46) and the output element (70).

15. The transmission drive unit (10) as claimed in claim 1, characterized in that the toric magnet (18) has exactly four magnetic poles (19) in the circumferential direction.

16. The transmission drive unit (10) as claimed in claim 1, characterized in that the toric magnet (18) has a radial wall thickness (102) of between 0.5 and 1.5 mm, and/or a ratio of the external diameter (100) to the wall thickness (102) of between 15:1 and 40:1.

17. The transmission drive unit (10) as claimed in claim 1, characterized in that the toric magnet (18) is configured as a high-energy magnet and contains rare earth elements, and is formed from NdFeB which is sintered or bonded in plastic.

18. The transmission drive unit (10) as claimed in claim 1, characterized in that a drive shaft (22) is mounted in the pole pot (16) by means of a sliding bearing (28), which is produced as a sintered bronze bush (29), and is mounted in the transmission housing (36) by means of a ball bearing (32).

19. A transmission drive unit (10), comprising:
a drive motor (12); and
a transmission (14) which is driven by the drive motor, the transmission (14) having an output element (70) and a self-locking device (60) with a locking element (62, 55), and the locking element (62, 55) locking the transmission (12) for torques which are introduced into the transmission (12) by the output element (70),
characterized in that the transmission (12) is configured with transmission toothing (47) and a motor shaft bearing (32, 28) in a manner which is optimized with respect to the degree of efficiency with minimum friction, and the drive motor (12) has, as an exciter magnet, a sleeve-shaped toric magnet (18) which is arranged in a pole pot (16) which forms a magnetic yoke,
characterized in that the diameter (44) of the drive shaft (22) is 6 mm and the worm (40) is roll formed onto the drive shaft (22) and has a greater external diameter (42) than the diameter (44) of the drive shaft (22).

* * * * *